United States Patent [19]
Artzberger

[11] 4,081,874
[45] Apr. 4, 1978

[54] HYDRAULIC DOCKBOARD SYSTEM

[75] Inventor: Thomas G. Artzberger, Menomonee Falls, Wis.

[73] Assignee: Kelley Company, Inc., Milwaukee, Wis.

[21] Appl. No.: 758,667

[22] Filed: Jan. 12, 1977

[51] Int. Cl.² .............................................. E01D 1/00
[52] U.S. Cl. .................................................... 14/71.7
[58] Field of Search ................. 14/71.7; 91/412, 28, 91/463, 29, 446, 155, 278, 159

[56] References Cited

U.S. PATENT DOCUMENTS

| | | | |
|---|---|---|---|
| 2,560,064 | 7/1951 | Astry | 14/71.7 X |
| 2,714,735 | 8/1955 | Watson | 14/71.7 |
| 2,774,492 | 12/1956 | Harrison | 14/71.7 X |
| 2,881,457 | 4/1959 | Rodgers | 14/71.7 |
| 2,993,219 | 7/1961 | Pennington | 14/71.7 |
| 3,175,238 | 3/1965 | Pennington | 14/71.7 |
| 3,201,814 | 8/1965 | Le Clear | 14/71.7 |
| 3,290,710 | 12/1966 | Whitenack | 14/71.7 |

Primary Examiner—Nile C. Byers
Attorney, Agent, or Firm—Andrus, Sceales, Starke & Sawall

[57] ABSTRACT

A hydraulic operating system for a series of dockboards mounted on a loading dock. Each dockboard includes a hydraulic cylinder unit that is employed to elevate the ramp, and a single hydraulic pump unit is utilized for the series of dockboards. A discharge line is connected to the outlet of the pump unit, while a return line connects the inlet of the pump to a reservoir, and individual supply lines are connected to the hydraulic cylinder units of each dockboard. A multiple position valve interconnects the discharge line, the return line and the supply lines and is operable to selectively direct hydraulic fluid through the discharge line to at least one of said supply lines to operate the corresponding cylinder unit and elevate the ramp of that dockboard, and for simultaneously connecting the other supply lines to the return line.

8 Claims, 3 Drawing Figures

HYDRAULIC DOCKBOARD SYSTEM

BACKGROUND OF THE INVENTION

The conventionally hydraulically operated dockboard is mounted in a pit in a loading dock and includes a ramp which is hinged at its rear edge to the supporting structure or frame and is adapted to be elevated from a generally horizontal cross traffic position to an upwardly inclined position by a hydraulic cylinder unit that is connected between the supporting structure and the ramp. A lip is hinged to the front edge of the ramp and can be pivoted between a downwardly hanging pendant position and an extended position where it forms an extension to the ramp.

By introducing fluid into the cylinder unit, the ram of the cylinder unit is extended to elevate the ramp. When the ramp has been elevated, the supply of hydraulic fluid to the cylinder is shut off, and the ramp will descend by gravity back toward the horizontal position, and the lip, which is extended at this time, will engage the bed of a truck or carrier located in front of the dock to ridge the gap etween the dock and the carrier bed.

In the past, hydraulic dockboards have been shipped as a complete unit to the site of installation, including the hydraulic system. By shipping the dockboard as a complete unit with the hydraulic system, installation of the dockboard at the dock site is facilitates.

In some cases, a series of dockboards, up to perhaps 15 to 20, may be installed in the loading dock and the practice in the past has been to install each dockboard as a complete unit with an individual hydraulic system.

SUMMARY OF THE INVENTION

The invention relates to a hydraulic system for multiple dockboards. In accordance with the invention, a series of dockboards are mounted on a loading dock and eack dockboard includes a hydraulic power unit, such as a hydraulic cylinder, which is employed to elevate the ramp, and a single hydraulic pump unit is utilized for the series of dockboards. The hydraulic system includes a discharge line connected to the outlet of the pump unit, while a return line connects the pump inlet to a fluid reservoir and an individual supply line is connected to the cylinder unit of each dockboard. A valve mechanism interconnects the discharge line, the return line and the supply lines and is operable to selectively direct hydraulic fluid from the discharge line to one or more of the supply lines, and for simultaneously connecting the other supply lines to the return line.

By directing fluid to a supply line, the corresponding cylinder unit will be actuated to raise the ramp of the dockboard to the elevated position. When the ramp has been fully elevated, the valve mechanism is operated to connect the supply line of the dockboard to the return line, so that the ramp can descend by gravity and the fluid will be conducted from the cylinder unit through the return line to the reservoir.

With the dockboard installation of the invention, only a single pump unit is required which is arranged to supply hydraulic fluid to the individual cylinder units of the various dockboards. This substantially reduces the cost of the installation over that of conventional hydraulic dockboard systems in which an individual pumping unit and control mechanism is incorporated with each dockboard.

The use of a single pump unit for the multiple dockboard arrangement eliminates the necessity of connecting electrical power lines to each pit, thereby reducing the cost of installation. The use of a single pump unit also reduces the cost of maintenance over systems utilizing an individual hydraulic unit for each dockboard.

The hydraulic dockboard system of the invention can be utilized either with new dockboard installations or with existing installations. With new installations the hydraulic lines interconnecting the various dockboards can be embedded in the concrete dock when it is poured, while with existing equipment, the hydraulic lines can be mounted on the front face of the dock.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
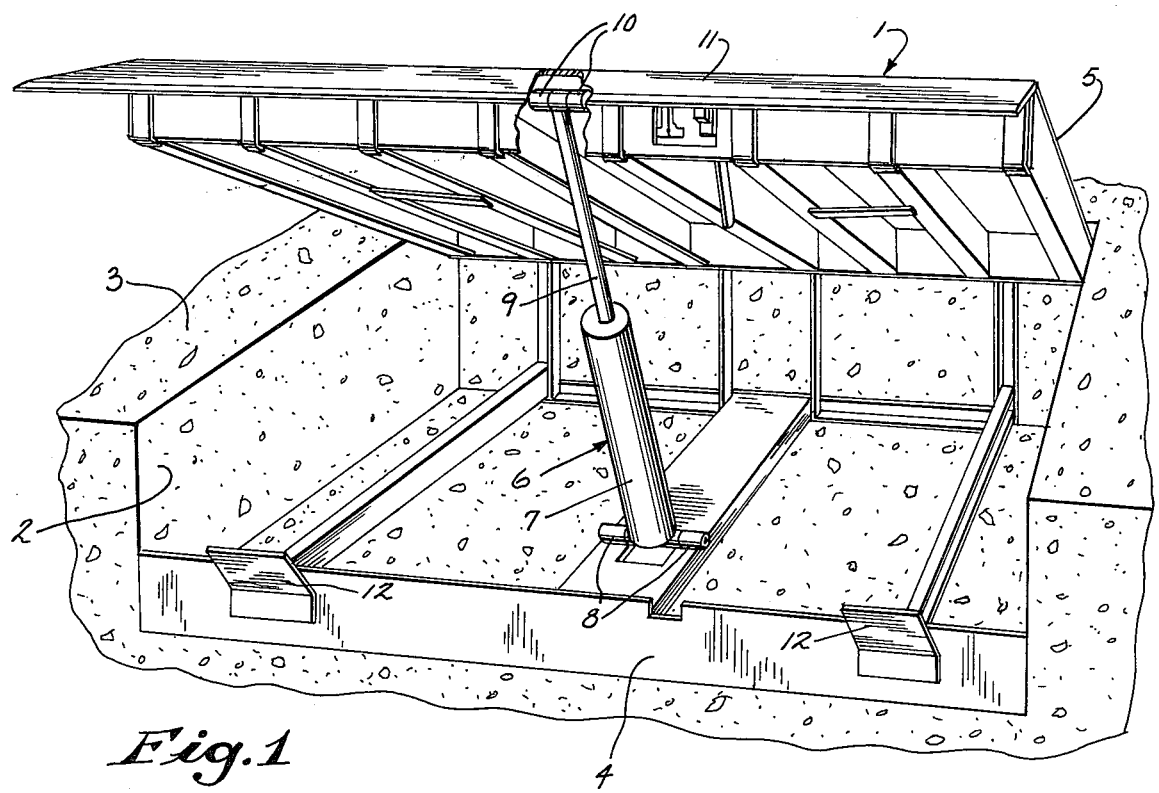
FIG. 1 is a perspective view of a dockboard incorporating the hydraulic system of the invention with the ramp shown in the elevated position.

FIG. 1 illustrates an adjustable dockboard 1 which is mounted within a pit or depression 2 in a loading dock 3. The dockboard 1 includes a frame or supporting structure 4 and a ramp 5 is hinged at its rear edge to the supporting structure and is movable between a generally horizontal cross traffic position and an upwardly inclined position, as shown in FIG. 1.

To move the ramp from the horizontal position to the upwardly inclined position, a hydraulic cylinder unit 6 is connected between the supporting structure 4 and the underside of the forward portion of the ramp 5. Cylinder unit 6 includes a cylinder 7 which is pivotally connected at its lower end to trunions 8 mounted on the supporting structure 4 and a ram 9 is slidable within the cylinder unit 6 and the upper end of the ram is pivotally connected to trunions 10 secured to the underside of the ramp.

Hinged to the forward edge of the ramp 5 is a lip 11 which can be pivoted from a dowmwardly hanging pendant position to an outwardly extending position in which the lip forms an extension to the ramp. Engagement of the rear edge of the lip 11 with the forward edge of the ramp 5 limits the pivotal movement of the lip with respect to the ram.

When the ramp 5 is in the cross traffic position, the downwardly hanging lip 11 is adapted to engage a pair of lip keepers 12 which are mounted on the forward edge of the supporting structure 4. Engagement of the lip 11 with the keepers 12 serves to retain the ramp in a generally horizontal position.

The lip can be moved from the pendant position to the outwardly extending position either as a consequence of upward movement of the ramp from the horizontal position toward the upwardly extending position, or alternately as a consequence of downward movement of the ramp from the upwardly inclined position toward the horizonal position. The specific mechanism for elevating the lip is not illustrated and in itself does not form a part of the invention. However, the lip can be elevated and latched in the extended position by a lip lifting and elevating mechanism similar to that shown in the U.S. Pat. No. 3,117,332, or alternately, the lip can be elevated on downward movement of the ramp through a mechanism similar to that shown and described in U.S. Pat. No. 3,997,932.

Figure 2:
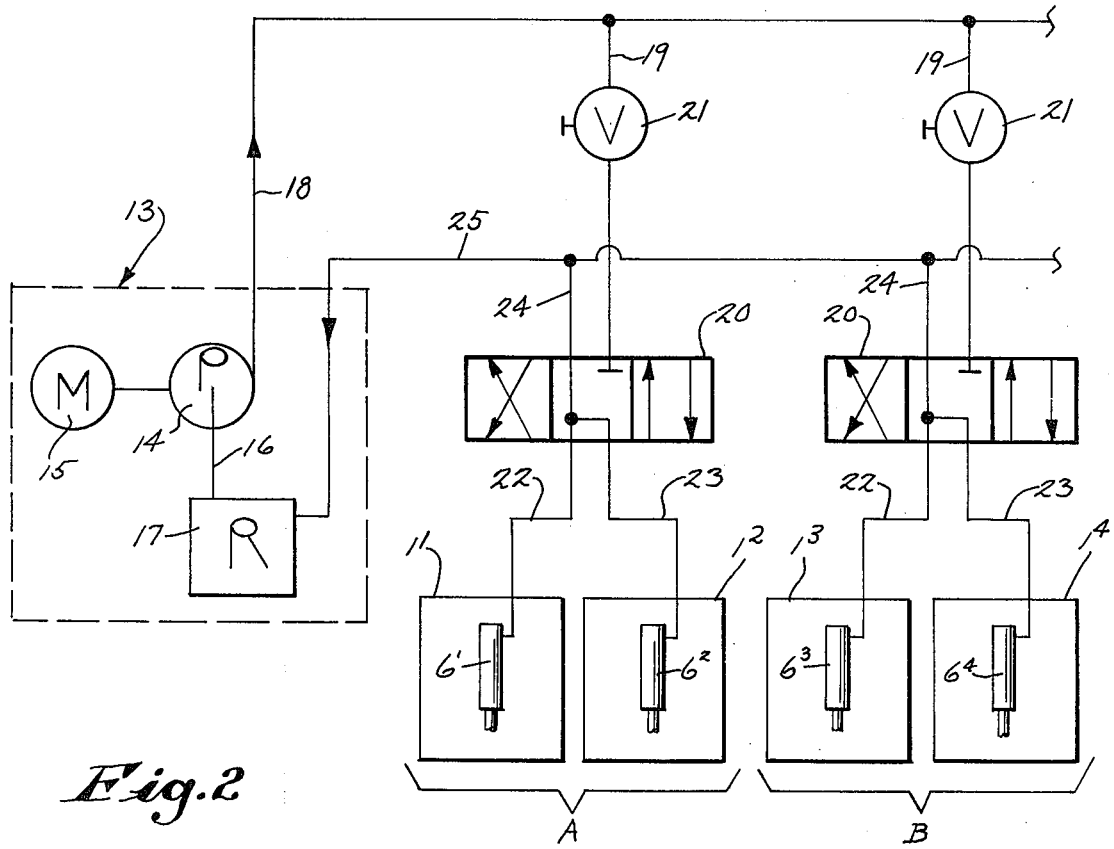
FIG. 2 is a schematic representation showing the hydraulic system.

In accordance with the invention, a single hydraulic pump unit 13 is employed to selectively operate the hydraulic cylinder units 6 of the various dockboards 1. The pump unit 13, as shown in FIG. 2, includes a pressure compensating variable volume pump 14, which is driven by an electrical motor 15. An inlet or suction line 16 connects the inlet of the pump 14 with a reservoir 17, while a discharge line 18 is connected to the outlet of pump 14.

The dockboards 1 are arranged in a series of groups which are designated, as illustrated in FIG. 2, as group A and group B. Group A includes a pair of dockboards $1^1$ and $1^2$ while group B includes a pair of dockboards designated as $1^3$ and $1^4$. While FIG. 2 shows two groups A and B, it is contemplated that any number of groups can be utilized, and similarly, any number of dockboards can be included in each of the groups.

A line 19 connects the discharge line 18 with a three-position valve 20 in each group, and a flow control valve 21 is located in each line 19. The flow control valve 21 is an adjustable type which can be adjusted to control the flow of hydraulic fluid through each of the lines 19.

Connecting each valve 20 with the dockboards of that group are supply lines 22 and 23. In addition, a line 24 is connected to each valve 20, and each line 24 is connected to the return line 25 that in turn is connected to the reservoir 17.

The three-position valves 20 can be operated by manual controls, or they can be power operated through controls located on the loading dock. When the valve 20 is in the central position, as shown in FIG. 2, the discharge line 18 is blocked so that no fluid will be supplied to the cylinder units 6 of the dockboards $1^1$ and $1^2$ and the dockboards will be in the horizontal or cross traffic position. At this time, the lines 22 and 23 are connected to the return line 25 so that the ramps of the dockboards $1^1$ and $1^2$ can freely float up and down in the event the ramps are engaged with the bed of a carrier.

By moving the valve 22 to the left, as shown in FIG. 2, the discharge line 18 will be connected with line 23 to thereby supply hydraulic fluid to the cylinder $6^2$ to elevate the ramp of the dockboard $1^2$. At this time, the line 22 will be connected through line 24 to the return line 25 so that the ramp of the dockboard $1^1$ will not be elevated but will be free to float vertically if subjected to an external force.

After the ramp of the dockboard $1^2$ has been elevated to its fully elevated position, the valve is returned to the position shown in FIG. 2, whereby both of the lines 22 and 23 will be connected to the return line 25, and in this condition, the ramp of the dockboard $1^2$ will descend by gravity causing the hydraulic fluid in the cylinder $6^2$ to return through the valve 20 and return line 25 to the reservoir 17.

When the valve 22 is moved to the right, as shown in FIG. 2, the supply line 18 will be connected to line 22 to thereby supply hydraulic fluid to the cylinder 6' of dockboard $1^1$ to elevate the ramp of that dockboard. At this time, the line 23 will be connected to the return line 25.

When the ramp of dockboard $1^1$ has been raised to its fully elevated condition, the valve will be returned to the central position shown in FIG. 2, in which case both of the lines 22 and 23 will be connected through return line 25 to the reservoir. Under this condition, the ramp of dockboard $1^1$ will descend by gravity and the hydraulic fluid in cylinder $6^1$ will be returned through line 22, line 24, and line 25, to the reservoir.

With the arrangement shown in FIG. 2, only one of the dockboards of each group can be elevated at one time. However, it is possible to simultaneously elevate dockboards of different groups.

The use of the flow control valve 21 enables simultaneous operation of a dockboard of each group. Without the use of the flow control valves 21, if more than one valve 20 was simultaneously operated, the dockboard in closest proximity to the hydraulic pump unit would be initially elevated and only after that dockboard was fully elevated would dockboards of the remaining groups be elevated. However, by restricting the flow of fluid through use of the control valves 21, it is possible to simultaneously elevate dockboards of each group. For example, if the total flow rate through discharge line 18 was 6 gallons per minute, and if six groups of dockboards were utilized, the control valves 21 could be set so that a flow rate of 1 gallon per minute would be supplied to the valve 20 of each group. By proportioning the flow, dockboards of each group can be simultaneously elevated.

Figure 3:
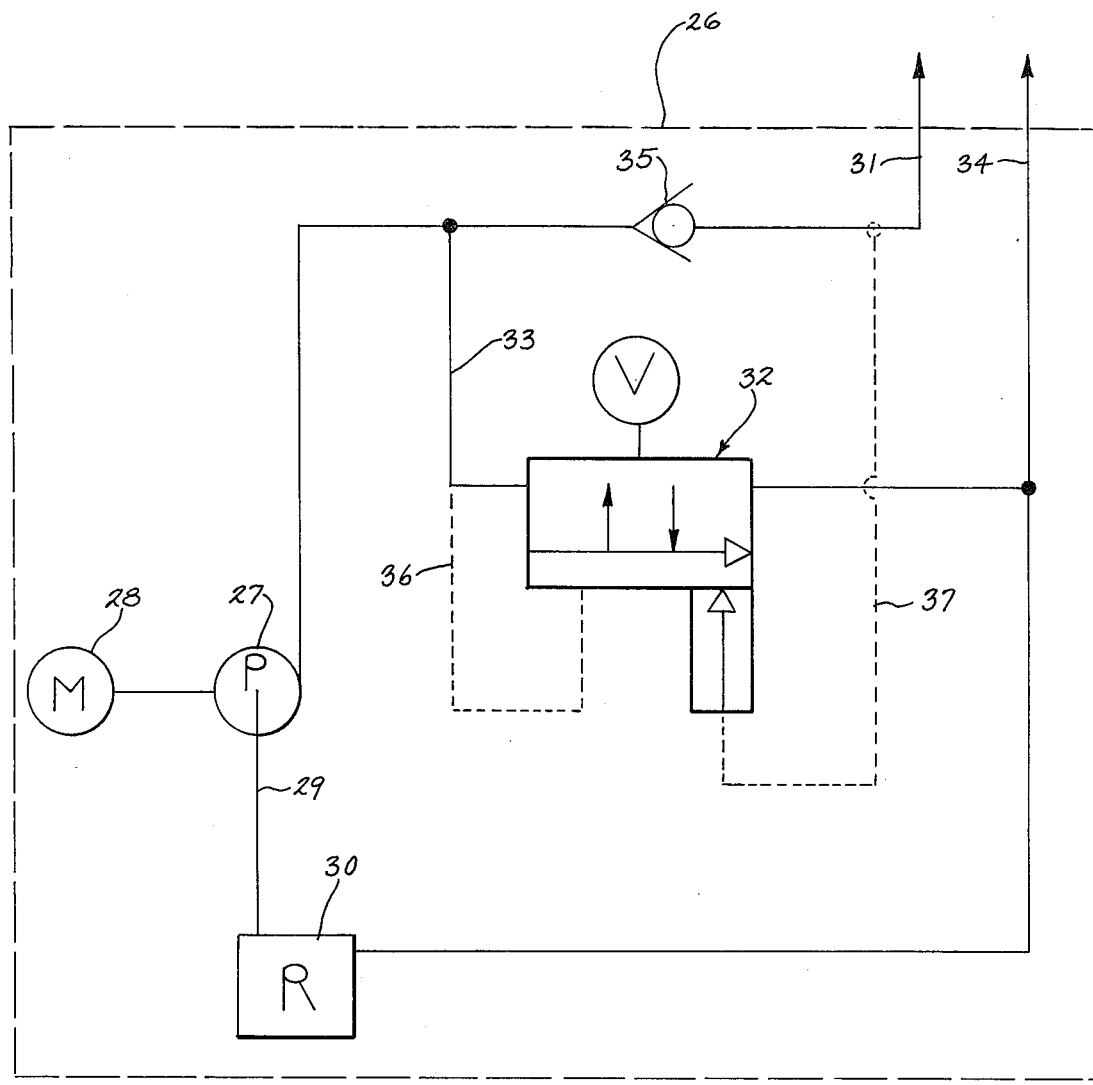
FIG. 3 is a schematic representation of a portion of the hydraulic system of a modified form of the invention.

FIG. 3 is a schematic representation of a portion of a modified form of the hydraulic system utilizing a fixed volume pump. As shown in FIG. 3, the pumping unit 26 includes a fixed volume pump 27 which is driven by a motor 28. Suction line 29 connects the inlet of the pump 27 to a reservoir 30, while a discharge line 31, corresponding to discharge line 18 of the first embodiment, is connected to the outlet of the pump.

To provide constant pressure in the discharge line 31, a differential unloading valve 32 is incorporated in a by-pass line 33 which connects the discharge line 31 and the return line 34, which corresponds to return line 25 of the first embodiment. A check valve 35 is connected in the discharge line 31 in parallel with unloading valve 32, and pressure lines 36 and 37 are connected between line 33 and the valve 32 and between the discharge line 31 and the valve. When the pressure in the discharge line 31 reaches a preset value, the unloading valve 32 will shift to the open position so that hydraulic fluid will be bypassed through line 33 to the return line 34 and hence to the reservoir. The valve 32 will shift back and forth between the open and closed positions to keep the pressure in the discharge line 31 constant with the pump operating continuously.

While the system, as shown in FIG. 2, utilizes a compensating variable volume pump to maintain a constant pressure in the discharge line, the system, as shown in FIG. 3 utilizes a fixed volume pump in combination with the differential unloading valve 32 to maintain constant pressure in the discharge line.

Operation of the system of FIG. 3, is the same as that described with respect to the system of FIG. 2, in raising and lowering the ramps of the various dockboards mounted in the loading dock.

With the system of the invention, a single pumping unit is employed to operate multiple dockboards mounted in the loading dock. This substantially reduces the overall cost of the dock loading system by eliminating a substantial number of hydraulic components, as well as eliminating the necessity of running electrical power lines to each pit of the loading dock.

The system of the invention can be incorporated with either new or existing construction. When installed with new construction the hydraulic lines interconnecting the various dockboards can be run through piping located within the concrete dock. With existing construction, the hydraulic lines can be run along the front face of the dock between the various dockboards.

Various modes of carrying out the invention are contemplated as being within the scope of the following claims particularly pointing out and distinctly claiming the subject matter which is regarded as the invention.

I claim:

1. A dock loading system, comprising a dock, a plurality of dockboards mounted on the dock, each dockboard including a supporting structure and a ramp hinged at its rear edge to the supporting structure and movable between a generally horizontal cross traffic position and an upwardly inclined position, each dockboard also including a hydraulic power unit connected between the supporting structure and the ramp for raising the ramp from the horizontal position to the upwardly inclined position, a discharge line, hydraulic pumping means connected to said discharge line for maintaining a substantially constant pressure in said discharge line, a return line connected to the inlet of the pumping means, a supply line connected to each power unit, and valve means operably interconnecting the discharge line, the return line, and the supply lines for selectively directing fluid from the discharge line through at least one of said supply lines to the corresponding power unit to thereby raise the ramp of the corresponding dockboard and for simultaneously connecting the other supply lines to the return line.

2. The system of claim 1, wherein said dockboards are arranged in groups with each group including at least two dockboards, said system including valve means for each group of dockboards and a branch line connecting the discharge line to each valve means.

3. The system of claim 2, and including flow control means in each branch line to control the rate of flow of hydraulic fluid from the discharge line to the respective valve means.

4. A hydraulic dock loading system, comprising a loading dock having a plurality of pits therein, a dockboard mounted in each pit with each dockboard including a supporting structure, a ramp hinged at its rear edge to the supporting structure and movable between a generally horizontal position and an upwardly inclined position, each dockboard including a hydraulic cylinder unit connected between the supporting structure and the ramp for raising the ramp from the horizontal position to the upwardly inclined position, said dockboards being arranged in a series of groups with each group comprising at least two dockboards, hydraulic pumping means, a discharge line for each group of dockboards and connected to the outlet of said pumping means, means for maintaining a substantially constant pressure in each discharge line, a return line for each group of dockboards and connected to the inlet of the pumping means, a supply line connected to the cylinder unit of each dockboard, valve means for each group of dockboards and operably interconnecting the discharge line and the return line and the supply line of that group for selectively directing fluid from the discharge line to at least one of said supply lines to raise the ramp of the corresponding dockboard and for simultaneously connecting the other supply lines of that group to the corresponding return line so that the ramps of the corresponding dockboards are free to float up and down.

5. The system of claim 4, and including flow control means in each discharge line to control the rate of flow of fluid through the respective discharge line whereby the flow through each discharge line constitutes only a portion of the total rate of flow of the pumping means.

6. A hydraulic dock loading system, comprising a loading dock having a plurality of pits therein, a dockboard mounted in each pit with each dockboard including a supporting structure, a ramp hinged at its rear edge to the supporting structure and movable between a generally horizontal position and an upwardly inclined position, each dockboard including a hydraulic cylinder unit connected between the supporting structure and the ramp for raising the ramp from the horizontal position to the upwardly inclined position, said dockboards arranged in a series of groups with each group comprising a pair of dockboards, a single hydraulic pumping means, a reservoir connected to the inlet of said pumping means, a discharge line for each group of dockboards and connected to the outlet of the pumping means, said pumping means being operable to maintain a substantially constant pressure in said discharge lines, a return line for each group of dockboards and connected to the reservoir, a supply line connected to the cylinder unit of each dockboard, valve means for each group of dockboards and operably connecting the discharge line, the return line and the supply lines of that group, each valve means having a first position wherein the supply lines are connected to the return line whereby the ramps can float freely up and down during a loading operation, and having a second position wherein a first of said supply lines is connected to the discharge line and a second of said supply lines is connected to the return line whereby fluid is supplied to the cylinder unit associated with said first supply line to thereby elevate the corresponding ramp and the ramp associated with the second supply line is free to float and having a third position wherein said second supply line is connected to the discharge line and said first supply line is connected to the return line whereby fluid is supplied to the cylinder unit associated with said second supply line to thereby elevate the corresponding ramp and the ramp associated with the first supply line is free to float, and means for moving said valve means between said positions.

7. The system of claim 6, and including flow control means in each discharge line to control the rate of flow of fluid through the respective discharge line whereby the flow through each discharge line constitutes only a portion of the total rate of flow of the pumping means.

8. The system of claim 6, and including means for maintaining a substantially constant pressure in each discharge line.

* * * * *